United States Patent [19]

Hehle et al.

[11] Patent Number: 5,427,517
[45] Date of Patent: Jun. 27, 1995

[54] APPARATUS FOR PELLETIZING DEHYDRATED PASTE MATERIAL, ESPECIALLY SLUDGE

[75] Inventors: Richard Hehle, Hoerbranz, Austria; Karsten Resch, Ueberlingen; Andreas Rutz, Lindau, both of Germany

[73] Assignee: Lindauer Dornier Gesellschaft mbH, Lindau, Germany

[21] Appl. No.: 282,969

[22] Filed: Jul. 29, 1994

[30] Foreign Application Priority Data

Aug. 2, 1993 [DE] Germany .................. 43 25 907.3

[51] Int. Cl.⁶ ............................................. B29B 9/00
[52] U.S. Cl. ...................................... 425/226; 264/39; 264/142; 425/183; 425/185; 425/311; 425/313
[58] Field of Search .............. 83/923; 425/215, 225, 425/313, 226, 311, 185, 290; 162/274; 209/379

[56] References Cited

U.S. PATENT DOCUMENTS

| 3,344,752 | 10/1967 | Ilines . | |
|---|---|---|---|
| 3,470,830 | 10/1069 | Carter et al. . | |
| 3,611,951 | 10/1971 | Sloan | 425/313 |
| 3,737,269 | 6/1973 | Grady | 425/313 |
| 4,822,454 | 4/1989 | Meirowitz et al. | 162/274 |
| 4,880,539 | 11/1989 | Crawford et al. | 162/274 |

FOREIGN PATENT DOCUMENTS 4013760 2/1992 Germany .
1750743 7/1992 U.S.S.R. .................. 209/379

Primary Examiner—Jay H. Woo
Assistant Examiner—John Robert Abel
Attorney, Agent, or Firm—W. G. Fasse; W. F. Fasse

[57] ABSTRACT

Clogging and prolonged down times are avoided in a pelletizer for paste type materials such as sludge by providing an extruder hopper with at least one, preferably two, lower edge slide gates which can be opened to permit movement of a clogged screen zone out of alignment with the discharge opening of the hopper. The clogging material can be scraped off from the screen portion that is taken out of alignment with the hopper discharge opening. The cutting of the extruded sludge is accomplished by an oscillating lower screen section that slides back and forth below the upper screen section. The upper screen section is provided with two, preferably three zones, two of which are perforated and one of which is unperforated to form a closure for the hopper discharge opening. Screeding non-pelletizable material off the screen surface is accomplished either by a separate screeding device or by operating the slide gate or gates as screeds.

15 Claims, 2 Drawing Sheets

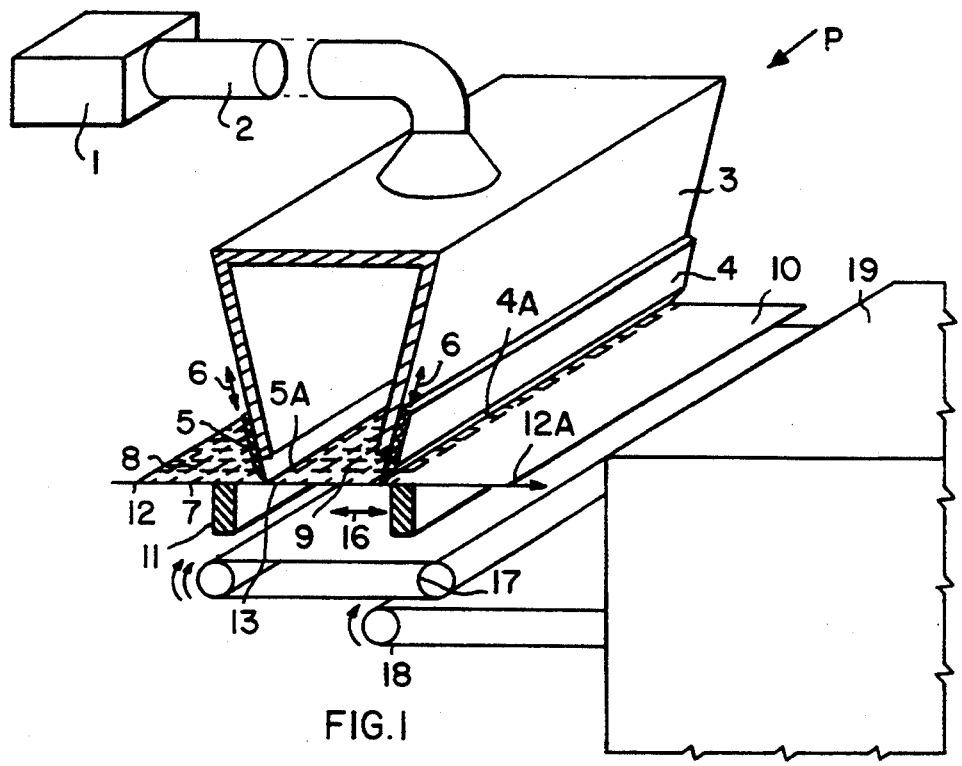
FIG.1
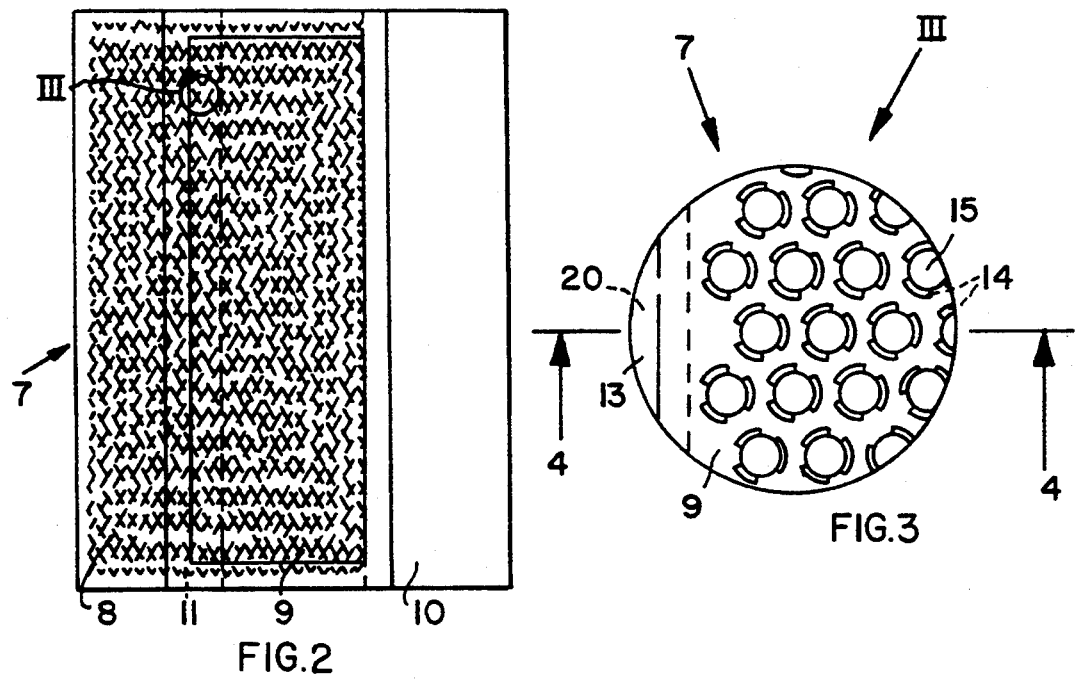
FIG.2
FIG.3

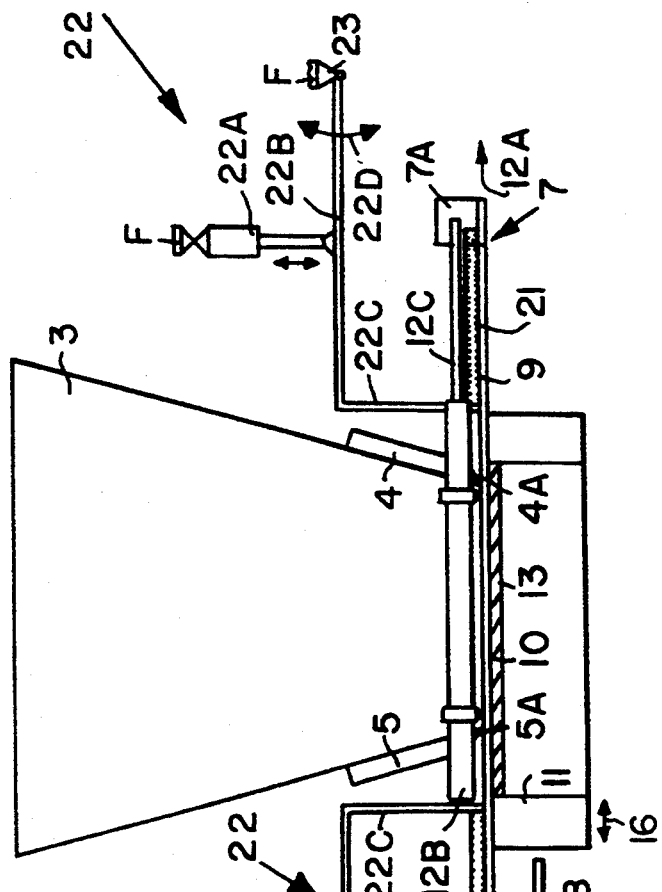
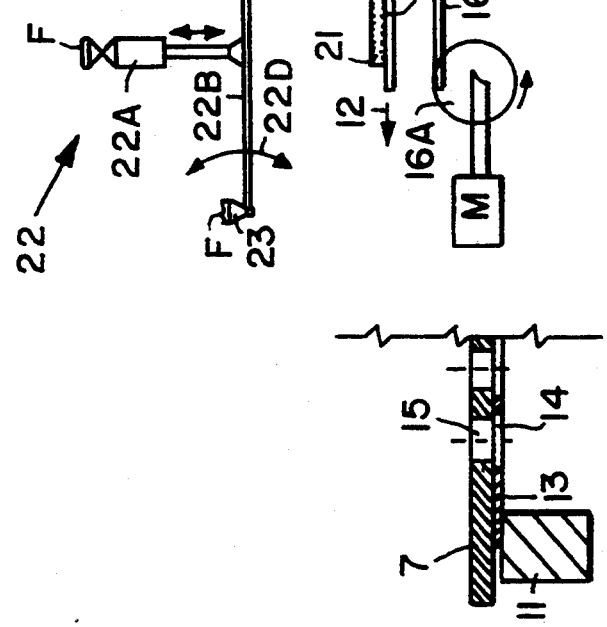

APPARATUS FOR PELLETIZING DEHYDRATED PASTE MATERIAL, ESPECIALLY SLUDGE

The invention relates to an apparatus for pelletizing paste material, especially sludge. Such sludge may, for example, become available in treatment plants for industrial and sewage wastes.

BACKGROUND INFORMATION

German Patent DE 4,013,760 C2 (Manzei) discloses an apparatus for the extruding of paste-like sludge material in the form of small sausage-shaped blanks. Extruders of this type are equipped with a plurality of extrusion holes that are provided as through-holes in a so-called matrix or screen having an upper screen section and a lower screen section. These through-holes have a tendency to clog, thereby reducing the efficiency since frequent stops are needed for cleaning of the screen. The German Patent DE 4,013,760 C2 teaches constructing the upper screen section as a shearing plate that cooperates with the lower screen section in severing the blanks from the extrudate. The cutting of precise and uniform blank lengths is not necessarily possible in the known device. Due to the shearing movement of the upper screen section functioning as a shearing plate, it is possible to shear materials in the sludge that are not moldable into the desired blanks. For this purpose the shearing plate or upper screen oscillates back and forth substantially in the same manner as in known pelletizers which employ a shearing plate for cutting off pellets from the extrudate. The lower screen section is stationary and the upper screen section functioning as the screening plate is driven by a suitable oscillator drive. Two oscillating screen sections may sandwich a stationary screen section between the oscillating screen section so that the entire screen is reversible. Even so, clogging cannot be avoided.

The just described apparatus of German Patent DE 4,013,760 C2 is not free of clogging problems and when clogging occurs the apparatus must be stopped for a cleaning operation. Thus, it is not possible to perform a cleaning operation while continuing the production of sausage-shaped blanks. Accordingly, a substantially continuous operation is not assured. This leaves room for improvement.

OBJECTS OF THE INVENTION

In view of the above it is the aim of the invention to achieve the following objects singly or in combination:

to construct a pelletizer for dehydrated paste-type material in such a way that a clogged screen does not require a prolonged stoppage of the operation and to permit a screen change during a very short duration stopping;

to construct a multi-section screen for a pelletizer in such a way that sludge components that resist pelletizing can be easily and efficiently removed from the screen;

to assure that the pelletized blanks all have a substantially defined dimension, especially with regard to the length thereof; and to construct the pelletizer in such a manner that intended shut-down of the apparatus does not result in screens that are hard to clean.

SUMMARY OF THE INVENTION

The pelletizer according to the invention is characterized in that the bottom exit or discharge opening of its sludge receiving hopper is enclosed at least laterally by substantially vertically displaceable slide gates. These slide gates rest in a sealing manner on the opening facing surface of a hopper facing screen section which has at least two zones. At least one zone of the hopper facing screen section is provided with through-holes to form the screen proper and the other screen zone does not have any holes to form a closure gate for the hopper discharge opening. The surface area of each of these zones corresponds at least to the cross-sectional flow area of the hopper exit or discharge opening surrounded by the laterally effective slide gate or gates. The hopper facing screen section also referred to as upper screen section, is connected to a separate first drive for moving one or the other screen zone into vertical alignment with the hopper discharge opening to either close the exit by the unperforated zone or to bring the perforated zone into its operational position. The other or lower screen section is also connected to its own drive forming a second drive that causes the lower screen to perform an oscillating movement at such timed intervals that the proper length of the blanks is determined. Further, a cleaning mechanism is so arranged that the perforated zone or zones of the upper screen section can be cleaned when the unperforated screen section or another perforated screen section cooperate with the hopper exit.

In the closed or lowermost position of the substantially vertically displaceable slide gate or gates, the latter rest or rests with the lower edge tightly against the upwardly facing sludge receiving surface of the upper screen section, thereby laterally closing the hopper exit so that sludge must either pass through the perforated screen section or is held in the hopper when the non-perforated screen section closes the hopper exit.

The upper screen section may be provided with a third zone that may also be a perforated zone. In such an embodiment the unperforated zone of the upper screen section may be arranged either between the two perforated zones in the same plane with the two perforated zones or alongside the two perforated zones. If the unperforated zone of the upper screen section is positioned between the two perforated zones, there will be a temporary very short duration interruption of the extruding and pelletizing process when the unperforated zone passes past the hopper exit. However, this short time interruption does not have any adverse influences.

It is an advantage of the invention that the blanks have substantially defined uniform diameter and length dimensions which are consistently produced in a substantially continuous operation. This production of pellets or blanks of uniform dimensions avoids a pelletizing step subsequent to a drying process. Further, a quick screeding off of the upper surface of the upper screen section is easily accomplished by the separate cleaning mechanism or by moving the upper screen section horizontally past the slide gates in their lower position. This quick cleaning operation permits the continuous operation of the present pelletizer because clogging is substantially avoided.

If it is intended to close the hopper discharge opening for a longer standstill, the upper screen is automatically moved into the position in which the unperforated zone of the upper screen section closes the hopper exit. This feature permits at any time an immediate resumption of the operation because the sludge that may have remained in the holes of the screen has dried inbetween to a size about one half to one third of the moist volume, whereby the dried pellets still sitting in the screen holes substantially remove themselves when the extrusion is resumed. The reduced sized dry pellet or sludge portions are easily pressed out by the pressure in the hopper. This pressure is maintained by the conveyor, for example, in the form of a screw conveyor that feeds the sludge into the hopper.

BRIEF DESCRIPTION OF THE DRAWINGS

In order that the invention may be clearly understood, it will now be described, by way of example, with reference to the accompanying drawings, wherein:

FIG. 1 is a schematic, perspective view of the present pelletizer partially in section also illustrating a sludge supply and a pellet dryer;

FIG. 2 is a plan view of the upper screen section having three zones superimposed on the lower screen section having one zone;

FIG. 3 shows an enlarged view of portion (3) in FIG. 2 illustrating the alignment of the holes of the upper screen section with the holes of the lower screen section;

FIG. 4 is a sectional view in the direction of the section line 4—4 in FIG. 3; and FIG. 5 is a schematic view illustrating the first shifting drive for the upper screen section, the second oscillating drive for the lower screen section, and a cleaning mechanism for screeding off sludge remainder from the upper surface of the upper screen section.

DETAILED DESCRIPTION OF PREFERRED EXAMPLE EMBODIMENTS AND OF THE BEST MODE OF THE INVENTION

In FIG. 1 the sludge is transported by a conveyor 1 such as a screw conveyor, pump conveyor, piston conveyor or the like through a pipe 2 into a funnel-shaped hopper 3 of the pelletizer P. The hopper 3 is closed on all sides except for its preferably downwardly facing discharge opening so as to permit a pressure build-up in the hopper 3 required for passing the sludge through the screen holes and perforations to be described below. The pressure developed by the screw conveyor 1 and the funnel-shaped cross-section of the hopper 3 make sure that the sludge is uniformly distributed over the lower exit or discharge opening of the hopper 3. At least one, preferably both lateral longitudinal edges of the hopper walls are closeable by longitudinal slide gates 4 and 5 which are movable substantially up and down as indicated by the double arrows 6. The downwardly facing edges 4A and 5A of the slide gates 4 and 5 respectively are preferably tapering downwardly so that these slide gates 4 and 5 can function as screeds when they contact the upwardly facing surface of an upper screen section 7 when the slide gates 4 and 5 are in the shown position rather than in the lifted position. The tapering edges 4A and 5A are preferred, however, squared edges are also suitable. In the shown position the gates 4 and 5 seal the downwardly facing opening of the hopper 3 in the lateral directions perpendicularly to the length of the long hopper side walls.

As shown in FIGS. 2, 3, and 4 the upper screen section 7 comprises three zones 8, 9 and 10. The zones 8 and 9 are zones with screen holes 15 therein while the zone 10 is an unperforated zone capable of closing the downwardly facing discharge opening of the hopper 3 when the upper screen section 7 is moved all the way to the left as indicated by the arrow 12 whereby the zone 10 is positioned below the downwardly facing opening of the hopper 3. When the upper screen section 7 is moved in the direction of the arrow 12A, the perforated screen zone 8 is brought into alignment with the downwardly facing opening of the hopper 3.

As shown in FIG. 2, the two perforated zones 8 and 9 are arranged alongside each other so that the nonperforated zone 10 is positioned alongside the perforated zone 9. In another embodiment the nonperforated zone 10 may be positioned between the perforated zones 8 and 9 as shown in FIG. 5. In still another embodiment the non-perforated zone 10 may be positioned alongside the perforated zone 8. The lower screen section 13 has a frame 11 and is provided with perforations 14. Both screen sections 13 and 7 form a screen system.

As shown in FIGS. 3 and 4, the smaller diameter holes 15 in the upper screen section 7 and the larger diameter perforations 14 in the lower screen section 13 are axially aligned with each other. Additionally, these holes have identical on-center spacings as seen in FIG. 3.

As best seen in FIG. 4, the upper screen section 7 is slideably supported on the lower screen section 13 which rests on its frame section 11. The horizontal movement of the screen section 7 as indicated by the arrows 12 and 12A and the horizontal oscillation of the screen section 13 with its frame 11 as indicated by the arrow 16 will be described below with reference to FIG. 5. Incidentally, the lower screen section 13 is provided with a single perforated zone. However, the lower screen section may also have several perforated zones, if desired.

Since the holes 15 in the upper screen section 7 have a smaller diameter than the perforations 14 in the lower screen section 13, the diameter of the pellets or blanks is solely determined by the diameter of the holes 15. This has the advantage that a clear length cutting is assured to provide blanks of uniform length. Additionally, this feature facilitates the cleaning of the screen sections, especially the upper screen section 7, since the larger perforations 14 facilitate the removal of dried sludge material from the holes 15.

Referring further to FIG. 4, providing the perforations 14 in the lower screen section 13 with a larger diameter than the holes 15 in the upper screen section 7 has the additional advantage that the separation of cut-off pellets or blanks is facilitated since the outer dimension of the blanks or pellets is determined only by the diameter of the holes 15 and contact with the edges of the larger perforations 14 is minimized.

It has been found in connection with testing a prototype, that the pressure generated by a screw conveyor is sufficient for passing the sludge through the screen sections. Thus, a pressure producing device in the hopper 3 itself is not needed. Further, the screen sections 7 and 13 may be relatively thin. In the prototype sludge having a dry substance content of 20 to 25% by volume was pelletized by using an upper screen section 7 having a thickness of 3 mm and a lower screen section 13 having a thickness of 1 mm. By using relatively thin sheet metal screen sections, the possibility of clogging is further reduced to a minimum. The oscillating drive of the lower screen section 11 makes sure that cut-off blanks or pellets are reliably removed from the screen sections to fall onto a first conveyor 17 which transports the cut-off pellets or blanks onto a second conveyor 18 for moving the blanks or pellets into the dryer 19. Depending on the particular structural and dimensional conditions, the conveyor 18 could extend further to the left below the opening surrounded by the lower screen frame 11 to obviate the need for the conveyor 17. Whether or not the conveyor 17 will be used may depend on the type of sludge to be treated.

FIG. 5 shows schematically the several drives for the present apparatus. A first drive in the form of a double acting piston cylinder device 12B is mounted in the machine frame F and has a piston rod 12C connected to a screen member 7A of the upper screen section 7 for moving the upper screen section 7 either in the direction of the arrow 12 or in the direction of the arrow 12A. The stroke of the piston rod 12C is sufficient to move any one of the three upper screen zones 8, 9 or 10 into alignment with the downwardly facing discharge opening of the hopper 3. The supply device 1, 2 has been omitted from the illustration of FIG. 5 for simplicity's sake.

The movement of the screen zones 8, 9 or 10 is just sufficient to bring non-pelletizable material 21 that has accumulated on screen zones 8 or 9 outside of the opening of the hopper 3. In FIG. 5 it is assumed that the two perforated screen zones 8 and 9 are arranged alongside the non-perforated screen zone 10 so that the latter is positioned between the two perforated screen zones 8 and 9. As shown, the discharge opening of the hopper 3 is closed by the unperforated screen zone 10. The removal of the material 21 will be described below.

A second drive 16A, for example a crank drive, or oscillating cam drive, is connected through a crank rod 16B to the frame 11 of the lower screen section 13 to oscillate the latter back and forth as indicated by the double arrow 16. The stroke of the drive 16A determines the length of the blanks that are being cut off by the oscillating lower screen section 13 as the sludge is being pressed through the holes 15 in the upper screen section 7. The length of the pellets or blanks is also determined by the pressure in the hopper 3 on which the extrusion speed depends.

The non-pelletable material 21 is removed on each side of the hopper 3 by a removing device 22 that operates as a screeding bar or blade. One such removing device is preferably positioned on each side of the hopper 3. For this purpose the device 22 is driven by a piston cylinder 22A connected with its piston rod to one leg 22B of the screeding device 22 which has an L-configuration with a further leg 22C for forming the screeding edge or bar. The piston cylinder device 22A is connected to the machine frame F and causes the respective screeding device 22 to tilt back and forth as indicated by the arrows 22D when the piston rods move up or down. For this purpose the first leg 22B of the screeding device 22 is pivoted to a pivot 23 connected to the machine frame F. In the shown position of the screeding edges 22C the material 21 on the screen zone 9 will be removed by shifting the upper screen section 7 to the left in the direction of the arrow 12. Similarly, the material 21 on the screen zone 8 will be removed by shifting the upper screen section 7 to the right in the direction of the arrow 12A.

Separate screeding devices 22 may be obviated by constructing the screen contact edges 4A and 5A of the slide gates 4 and 5 as screeding edges. In this connection the slide gates 4 and 5 would be open to move the respective screen zone 8 or 9 out of alignment with the discharge opening of the hopper 3. Then the gate would be closed and the respective screen section shifted in the proper direction. For example, the material 21 on the screen zone 8 can be removed when the slide gate 5 is closed and the upper screen section 7 is moved to the right as indicated by the arrow 12A. Similarly, the material 21 on the screen zone 9 can be removed when the gate 4 is closed and the upper screen section 7 is moved to the left as indicated by the arrow 12. The gates 4, 5 are first opened to permit laterally moving the accumulated material 21 out of the hopper 3. Then the gates are closed for the screeding.

In operation, the throughput through the perforated zone 8 or 9 of the upper screen section 7 presently in its working position under the discharge opening of the hopper 3, is monitored. If the discharge becomes nonuniform because a plurality of holes 15 in the working screen zone 8 or 9 have become clogged by non-pelletizable material, the respective slide gate 4 or 5 is opened and the working screen zone is moved out of the alignment with the discharge opening while the other clean zone is moved simultaneously into the working position. Thus, the continuation of the extrusion is virtually uninterrupted except for the brief duration needed to shift the upper screen section 7 from one position into the other. The respective slide gate 4 or 5 is then again closed to contact the upwardly facing surface of the upper screen section 7.

If it is necessary to stop the pelletizing operation for a prolonged period of time, the unperforated zone 10 of the upper screen section 7 is moved into a position to close the discharge opening of the hopper 3 so that the respective perforated zones 8 and 9 are accessible for the screeding. Any sludge that should get stuck in the holes 15, 14, will dry sufficiently to reduce its volume so that any such dried sludge portions will fall downwardly out of the holes 14, 15. The oscillating movement imposed on the lower screen section 11, 13 will facilitate the removal of the dried sludge portions, especially since the perforations 14 have a larger diameter than the holes 15, as mentioned above.

The present apparatus is very efficient in its operation because the problem of clogging has been substantially avoided and because the forward and backward stroke of the lower screen section 11, 13 is effective as a cutting stroke. Additionally, clogged screens can be cleaned substantially without interrupting the operation.

Although the invention has been described with reference to specific example embodiments, it will be appreciated that it is intended to cover all modifications and equivalents within the scope of the appended claims.

What is claimed is:

1. An apparatus for pelletizing paste material, comprising a hopper (3) enclosing a space for holding paste material, a supply conveyor for feeding paste material into said space under a pelletizing pressure, said hopper having a discharge opening and at least one slide gate (4 or 5) for laterally closing said discharge opening, a screen system positioned relative to said discharge opening for covering said discharge opening, said screen system comprising a first screen section (7) next to said discharge opening and a second screen section (11, 13) in parallel to and in sliding relationship with said first screen section away from said discharge opening, said slide gate resting against an opening facing surface of said first screen section when said slide gate is in its closing position, said slide gate providing a lateral passageway when said slide gate is in its open position, said first screen section having at least one zone provided with through-holes (15) therein and one unperforated zone for closing said discharge opening, each screen zone having an area for covering said discharge opening of said hopper, said second screen section having perforations (14) therein, a first drive (12B, 12C) for providing relative movement between said first screen section (7) and said discharge opening, a second drive (16A) connected to said second screen section (11, 13) for oscillating said second screen section relative to said first screen section (7) to cut lengths of extruded material.

2. The apparatus of claim 1, wherein said first drive (12B, 12C) is connected to said first screen section (7) for moving said first screen section back and forth relative to said hopper across said discharge opening and crosswise to said slide gate.

3. The apparatus of claim 1, wherein said supply conveyor comprises a screw conveyor (1) for establishing said pelletizing pressure in said hopper (3).

4. The apparatus of claim 1, wherein said through-holes (15) in said first screen section (7) and said perforations (14) in said second screen section (11, 13) are aligned on-center with each other, said through-holes (15) having a first on-center spacing from one another, said perforations (14) having a second on-center spacing from one another, said first and second on-center spacings being equal to each other.

5. The apparatus of claim 1, wherein said first screen section has two perforated zones (8, 9) each with through-holes therein, said unperforated zone being positioned alongside one of said perforated zones opposite the other perforated zone.

6. The apparatus of claim 1, wherein said first screen section has two perforated zones each with through-holes therein, said unperforated zone being positioned between said two perforated zones.

7. The apparatus of claim 1, wherein said through-holes (15) of said first screen section have a first diameter, wherein said perforations of said second screen section have a second diameter that is larger than said first diameter.

8. The apparatus of claim 1, wherein said hopper has an elongated, downwardly opening funnel cross-sectional configuration, so that said discharge opening faces down and said screen system extends substantially horizontally.

9. The apparatus of claim 8, comprising two elongated slide gates (4 and 5) slideably arranged alongside said discharge opening of said hopper to laterally close said discharge opening when said slide gates are in a closing position contacting said opening facing surface of said first screen section, each slide gate opening a respective lateral passageway, said passageways facing in opposite directions.

10. The apparatus of claim 1, further comprising a device for removing non-pelletizable material comprise a screeding blade and a third drive connected to said screeding blade for moving said screeding blade into and out of a screeding position.

11. The apparatus of claim 10, wherein said third drive (22) comprises a piston cylinder device for tilting said screeding blade into a screeding position.

12. The apparatus of claim 1, wherein said slide gate has a screen contact edge that tapers toward said opening facing surface of said first screen section.

13. The apparatus of claim 1, wherein said first drive is a double acting piston cylinder device connected to said first screen section for moving said first screen section in two opposite directions.

14. The apparatus of claim 1, wherein said second drive (16A) is a crank drive for oscillating said second screen section (11, 13).

15. The apparatus of claim 1, wherein said slide gate (4 and/or 5) functions as a removing device for material when said slide gate is in its screen contacting position.

* * * * *